United States Patent [19]

Kawai

[11] Patent Number: 5,120,002
[45] Date of Patent: Jun. 9, 1992

[54] SPOOL DETACHABLE MECHANISM FOR FISHING REEL

[75] Inventor: Michiki Kawai, Tokyo, Japan

[73] Assignee: Daiwa Seiko, Inc., Tokyo, Japan

[21] Appl. No.: 561,596

[22] Filed: Aug. 1, 1990

[30] Foreign Application Priority Data

Aug. 10, 1989 [JP] Japan .................. 1-93447[U]
Nov. 17, 1989 [JP] Japan ................. 1-133073[U]

[51] Int. Cl.⁵ ............................................ A01K 89/015
[52] U.S. Cl. ......................................................... 242/314
[58] Field of Search ............... 242/310, 312, 314, 318, 242/322; 403/348, 349

[56] References Cited

U.S. PATENT DOCUMENTS

| 847,350 | 3/1907 | Marhoff | 242/314 |
|---|---|---|---|
| 1,005,154 | 10/1911 | Catucci | 242/314 X |
| 1,812,220 | 6/1931 | Shakespeare, Jr. | 242/314 |
| 3,473,753 | 10/1969 | Hull | 242/314 X |
| 3,565,362 | 2/1971 | Lilland | 242/322 |
| 3,603,524 | 7/1971 | Nurmse et al. | 242/322 X |
| 4,390,140 | 6/1983 | Karlsson et al. | 242/312 X |
| 4,593,866 | 6/1986 | Moosberg et al. | 242/314 X |
| 4,615,191 | 10/1986 | Grandy | 403/349 X |
| 4,881,398 | 11/1989 | Daubner et al. | 403/349 X |
| 4,917,525 | 4/1990 | Duncan | 403/349 X |

FOREIGN PATENT DOCUMENTS 60-199334 10/1985 Japan .

*Primary Examiner*—Joseph J. Hail, III
*Attorney, Agent, or Firm*—Longacre & White

[57] ABSTRACT

The fishing reel is constructed in such a manner that a support member for supporting a spool is detachably attached to an opening portion formed on one of side plates so as to perform the exchange of the spool. Further, the opening portion is provided with engaging projections and the engaging pin, and the support member is provided with a flange having notches and with recess portions, so as to detachably attach the support member to the opening portion by the easy rotating operation of the support member. Therefore, a fisherman can easily and rapidly perform the exchange operation of the spool by only his one hand.

15 Claims, 6 Drawing Sheets

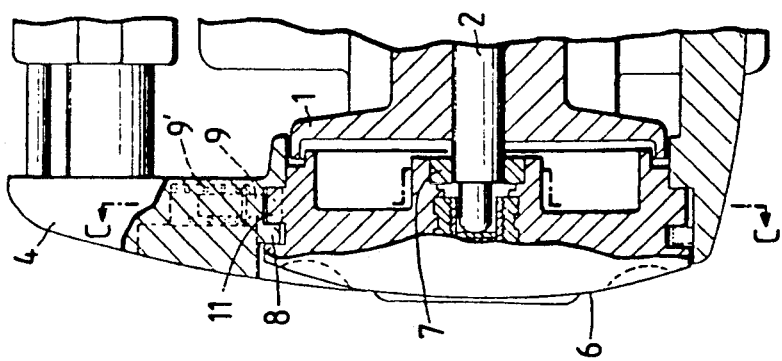
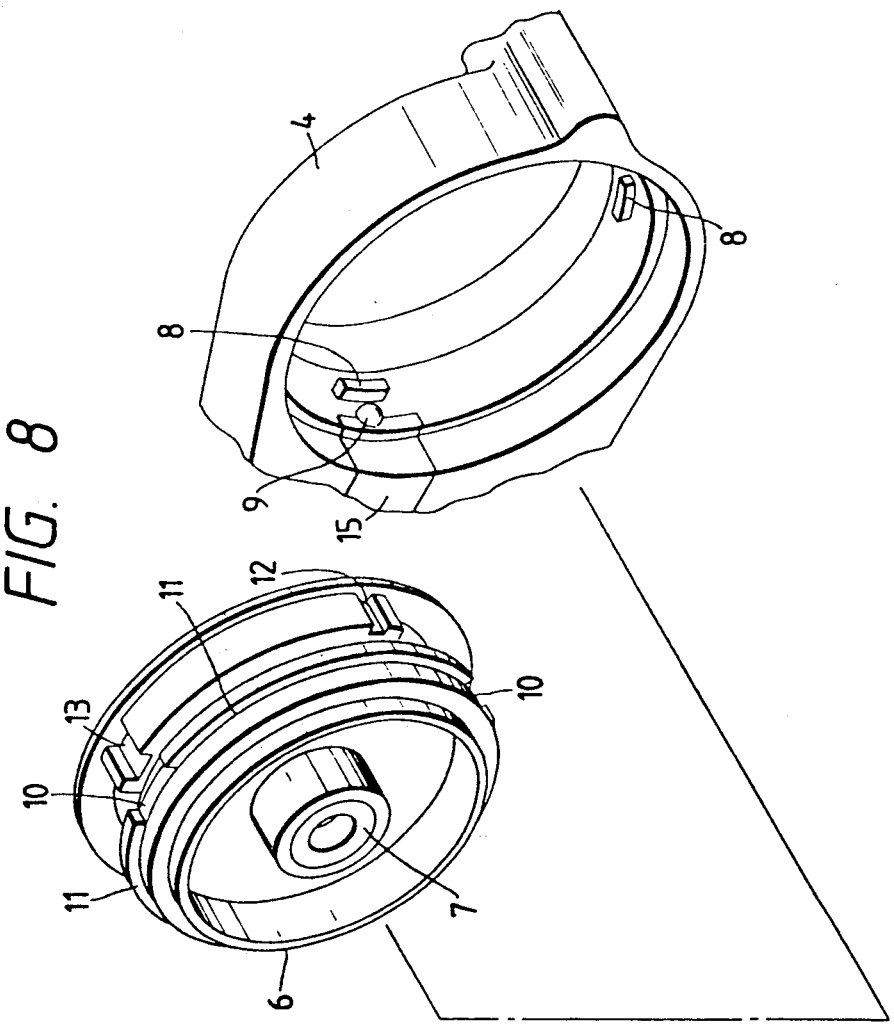

SPOOL DETACHABLE MECHANISM FOR FISHING REEL

BACKGROUND OF THE INVENTION

This invention relates to an improvement for a mechanism for detaching from a fishing reel a spool supported at both sides thereof to the reel.

A fisherman often encounters the case where a fishing line is to be exchanged by another fishing line when the fishing line is shortened because of the wear and tear, a fishing line is entangled or a fishing line having a different diameter is desired to be used. In this case, he interchanges a spool onto which the fishing line is wound to another spool onto which the desired fishing line is wound. For this end, Japanese Patent Application Unexamined Publication No. 60-199334 proposes a fishing reel having a cap provided with a bearing portion for supporting a spool shaft thereto. The cap is detachably engaged with a side plate of the reel in such a manner that the cap can be attached to and detached from the side plate without using a tool or the like.

The fishing reel, however, has a disadvantage in that since the cap engaged with the side plate is detached therefrom by rotating the cap while depressing a button provided on the side plate, it is difficult for a fisherman to rapidly, easily perform the detaching operation by only one hand, and therefore the fisherman must use his both hands for the operation. This detaching operation is very troublesome.

Further, the button protrudes from the side plate of the reel and is exposed to the outside, so that mucus of a fish, bait for the fish, sand, or the like, which clings to the fisherman's hands, is likely to be in turn adhered to the button. Thus there is a tendency that the button would lose its function.

SUMMARY OF THE INVENTION

It is therefore an object of the present invention to provide a fishing reel by which the above-mentioned problem is to be solved.

It is another object of the present invention to provide a fishing reel in which a spool shaft support member having a bearing portion for supporting a spool shaft can be rapidly, easily attached to and detached from a side plate of the reel by one-touch operation, i.e., the mere rotating operation of the support member in order to interchange spools.

In order to attain the above-noted and other objects, the present invention provides a fishing reel wherein one of side plates is formed with an opening portion through which a spool can be attached to and detached from the reel, a spool shaft support member having a bearing portion for supporting one end of the spool shaft thereto is detachably attached to the opening portion, comprising: at least one of engaging projection portion protruding from an inner circumferential surface of the opening portion of the side plate; an engaging flange portion formed on an outer peripheral surface of the spool shaft support member and positioned at inner side of the engaging projection portions so as to securely attach the support member to the side plate, the engaging flange portion having at least one of notch portion through which the engaging projection can be inserted into the inner side; an engaging pin provided on the side plate so as to protrude from the inner circumferential surface of the opening portion and to be biased in the direction to the radially inwardly of the opening portion; an engaging recess portion formed on the outer peripheral surface of the spool shaft support member at a position where the engaging pin is engaged with the engaging recess portion when the engaging flange portion is engaged with the engaging projection portions; and a non-engaging recess portion formed on the outer peripheral surface of the spool shaft support member at a position where the engaging pin is engaged with the non-engaging recess portion when the notch portion is confronted with the engaging projection portion to allow the engaging projection portions to pass therethrough.

The engaging flange portion having the notch portion is provided at the inner side from the engaging recess portion and non-engaging recess portion on the outer peripheral surface of the spool shaft support member, or otherwise the engaging flange portion may be aligned with the engaging recess portion and the non-engaging recess portion on a line on the peripheral surface of the support member for the purpose of reducing the thickness of the spool shaft support member and the side plate.

The present invention also provides a fishing reel having a first side plate for supporting one end of a spool shaft of a spool, a second side plate confronted with the first side plate at a predetermined distance and provided with an opening portion through which the spool can be inserted into the reel in place between the first and second side plates, the opening portion being provided with an inner circumferential surface portion, and a support member detachably, rotatably fixed to the opening portion, having a bearing portion for supporting the other end of the spool shaft and an outer peripheral surface portion confronted with the inner circumferential surface portion when the support member is fixed to the opening portion, the fishing reel comprising: at least one of projecting portion protruding from the inner circumferential surface portion for defining a first side and a second side at their both sides; a flange portion formed on the outer peripheral surface portion and slidingly guided b the projecting portions on the first side, the flange portion including at least one of first notch portion through which the projecting portion passes to thereby position the flange portion between the first and second sides; an engaging pin provided in the opening portion and biased in the direction of a radially inwardly of the opening portion so that a tip of the engaging pin protrudes from the inner circumferential surface portion; first means for positioning the support member at a release position where the first notch portion is confronted or aligned with the projection portion on the first side; second means for positioning the support member to a lock position where the flange portion is engaged with the projection portion on the first side.

The first and second means selectively position the support member at the release position and the lock position in such a manner that the first and second means are selectively engaged with the engaging pin, so that they preferably include notches or recesses.

Further, in order to easily rotate the support member, recess portions or concave portions for rotating the support member by fisherman's fingers are preferably formed on the outer surface of the spool shaft support member.

According to the present invention, in the case where the spool shaft support member is securely fixed to the side plate, the engaging flange portion is fitted to and engaged with the engaging projection portion and the engaging pin is engaged with the engaging recess portion so as to keep the state. On the other hand, in the case where the spool is interchanged to another, if the spool shaft support member is rotated so as to engage the pin engaged with the engaging recess portion with the non-engaging recess portion, then the engaging projection portion is rotated so as to be confronted or aligned with the notch portion of the engaging flange portion. Therefore, the spool shaft support member can be detached from the opening portion of the side plate to thereby detach the spool with the spool shaft from the reel through the opening portion and attach another spool to the reel.

After interchanging the spool, the support member is inserted into and attached to the opening portion of the side plate in such a manner that the engaging projection portion passes through the notch portion of the engaging flange portion. After that, the support member is rotated so as to engage the engaging pin with the engaging recess portion and engage the engaging projection portion with the engaging flange portion, to thereby securely fix the support member to the opening portion of the side plate.

BRIEF DESCRIPTION OF THE DRAWINGS

In the accompanying drawings:

FIG. 8 is an exploded perspective view of the fishing reel;

FIG. 9 is a partially fragmentary plan view showing a fishing reel according to another embodiment of the present invention;

DETAILED DESCRIPTION OF THE PREFERRED EMBODIMENTS

Figure 1:
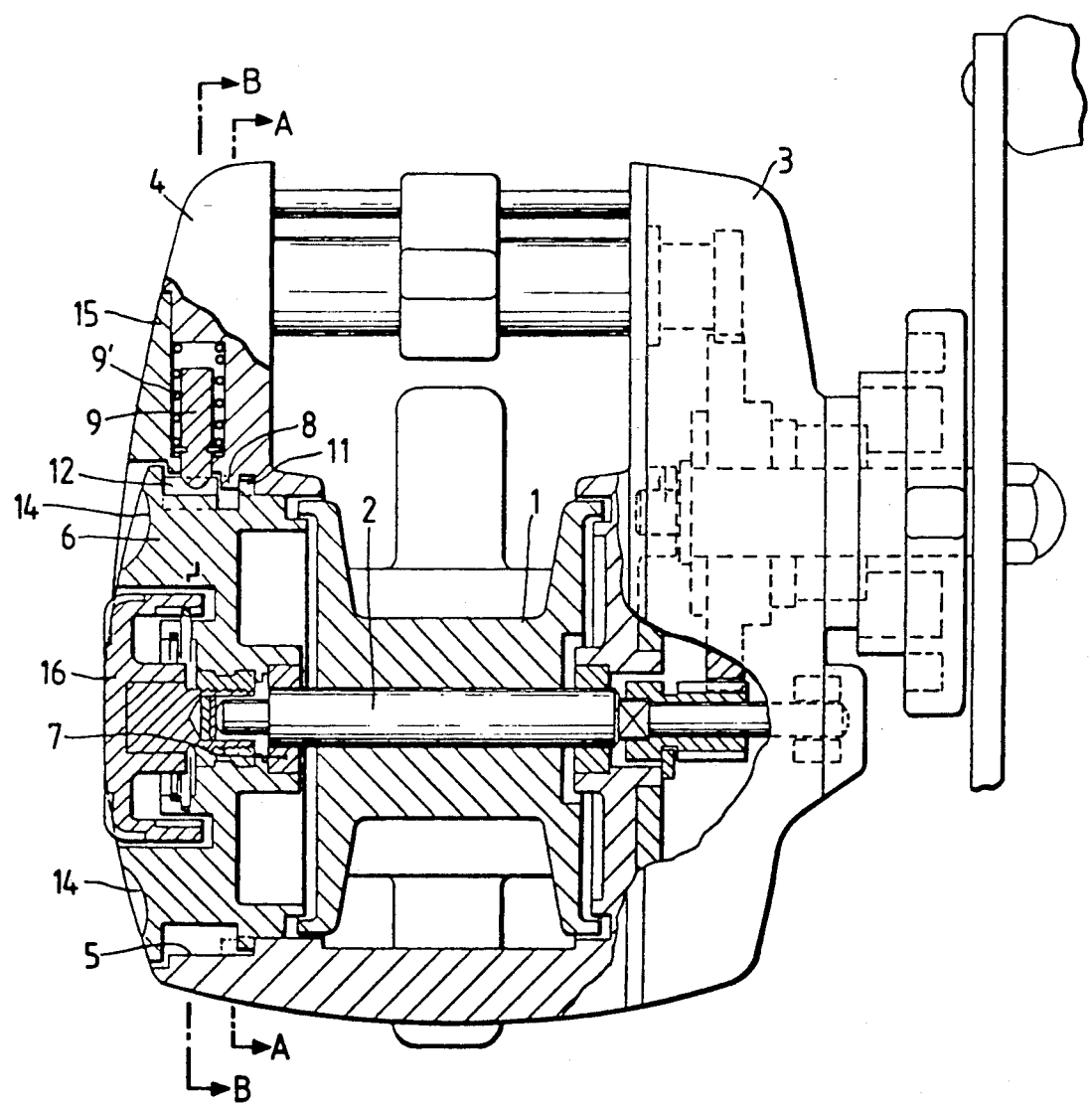
FIG. 1 is a partially fragmentary plan view showing a fishing reel according to an embodiment of the present invention.
Figure 3:
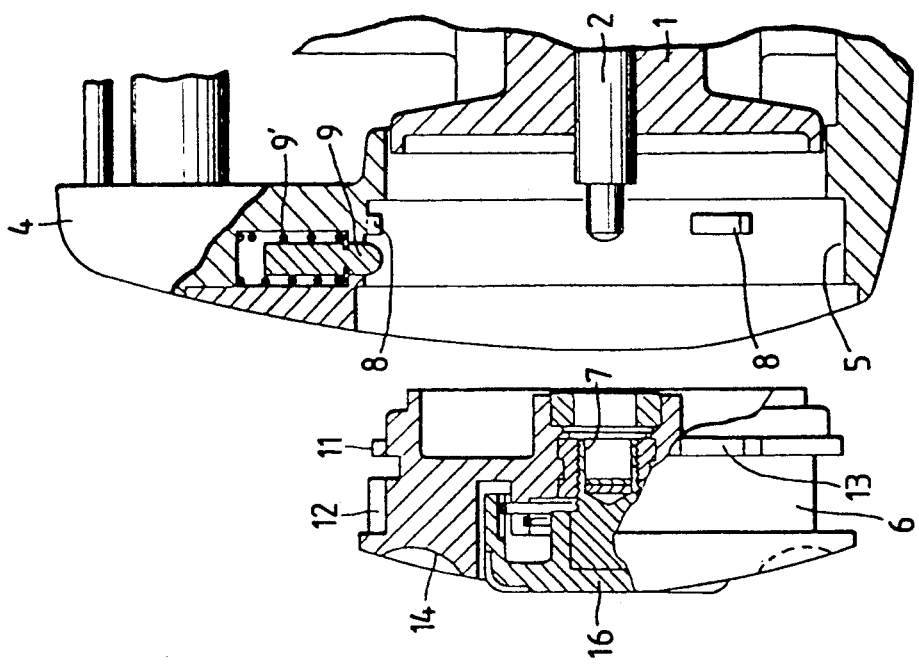
FIG. 3 is a partially sectional plan view showing a state where a spool shaft support member is separated from a side plate.
Figure 2:
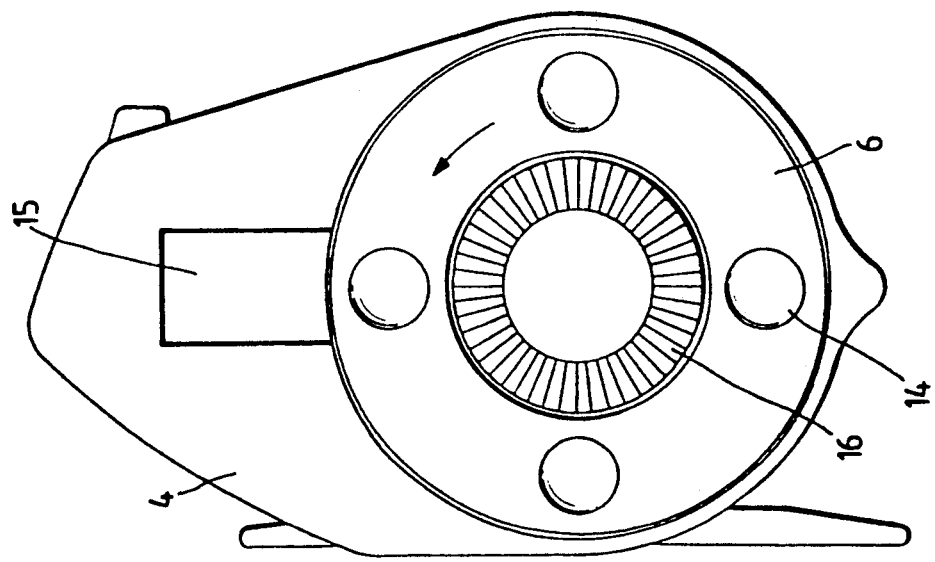
FIG. 2 is a frontal view of the fishing reel.

The present invention will be hereinafter described in detail with reference to the accompanying drawings.

FIGS. 1 to 8 illustrate a fishing reel constructed according to a first embodiment of the present invention, in which a spool shaft 2 securely fixed to a spool 1 is supported at its one end to a side plate 3 having a driving mechanism and at its other end to a side plate 4 confronted with the side plate 3. More particularly, the side plate 4 is formed with an opening portion 5, and provided with a spool shaft support member 6 detachably fixed to the opening portion 5. The spool shaft support member 6 is provided with a bearing portion 7 for supporting the other end of the spool shaft 2. Therefore, the last-mentioned end of the spool shaft 2 at a side of the side plate 4 is rotatably supported to the bearing portion 7 of the spool shaft support member 6 detachably fixed to the opening portion 5 formed in the side plate 4. If the support member 6 is detached from the opening portion 5, then the spool 1 can be interchanged to another through the opening portion 5.

In order to detachably fix the support member 6 to the opening portion 5 of the side plate 4, the fishing reel is provided with at least one of engaging projection 8, an engaging pin 9, an engaging flange portion 11, an engaging recess or notch portion 12, and a non-engaging recess or notch portion 13. The engaging projection 8 protrudes from an inner surface of the opening portion 5. The engaging pin 9 is biased by a spring member 9' in the direction to a radially inwardly of the opening portion 5 so as to project from the inner surface of the opening portion 5. The engaging flange portion 11 is provided on a peripheral surface of the spool shaft support member 6. The engaging flange portion is substantially in the form of a ring. The flange portion 11 is formed with an at least one of notch portion 10 in such a manner that the engaging projection 8 can be inserted through the notch portion 10. The engaging pin 9 can be engaged with one of the recess portions 12 and 13 when the support member 6 is inserted into the opening portion 5 of the side plate 4 in such a manner that the engaging projections 8 are inserted into the left hand side (in FIG. 1) of the flange portion 11 through the notch portions 10. When the engaging pin 9 is engaged with the engaging recess portion 12, the engaging flange portion 11 is engaged with engaging projections 8. On the other hand, when the engaging pin 9 is engaged with the non-engaging recess portion 13, the engaging projection is confronted or aligned with the notch portion 10 of the flange portion 11.

Further, in this embodiment, the spool shaft supporting member 6 is formed with recess portions 14 for rotating the support member 6 by the fisherman's fingers. Additionally, the reference numeral 15 designates a member for fixing the engaging pin 9 in place, and 16 designates a device for adjusting the braking force to be applied to the spool shaft 2.

Figure 4:
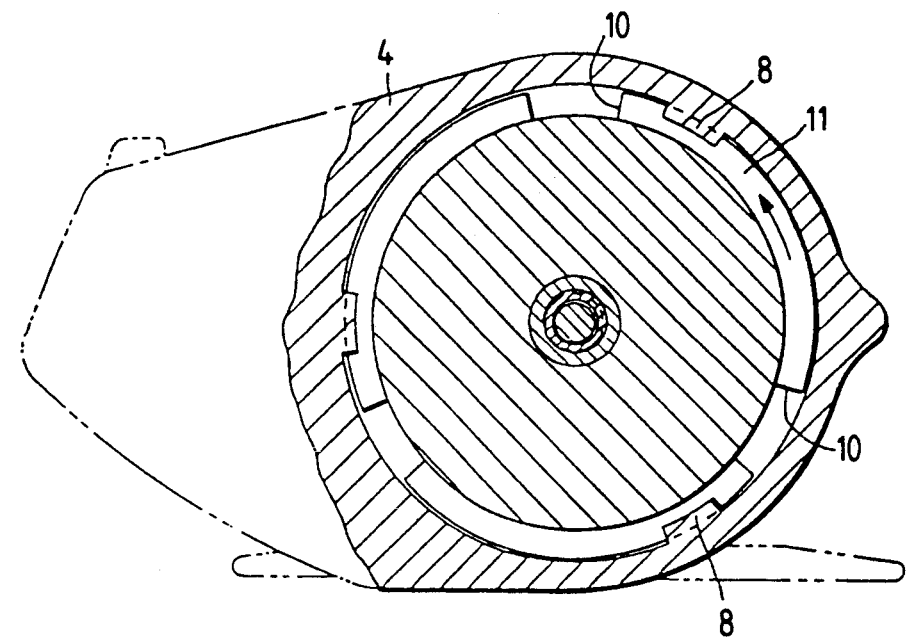
FIG. 4 is a cross-sectional view taken along line A-A of FIG. 1.
Figure 5:
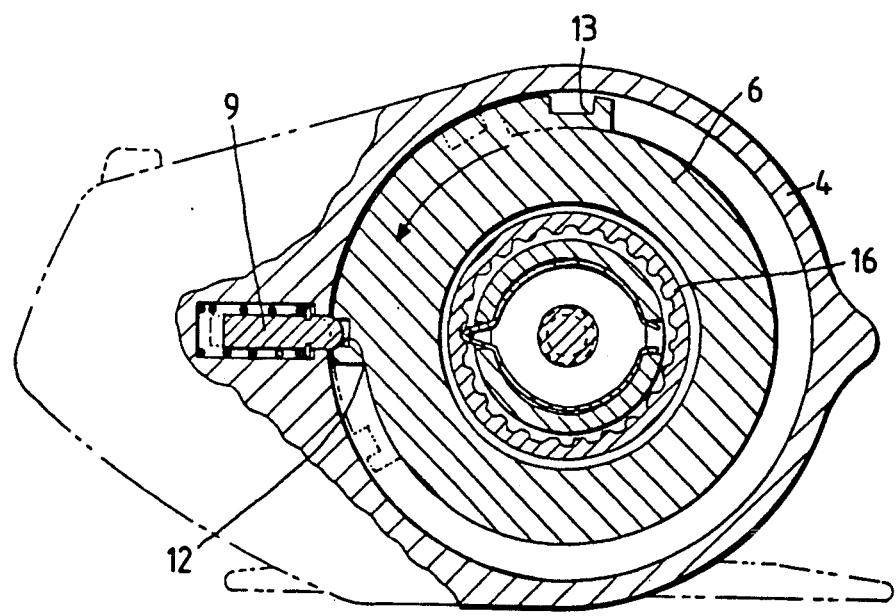
FIG. 5 is a cross-sectional view taken along line B-B of FIG. 1.
Figure 6:
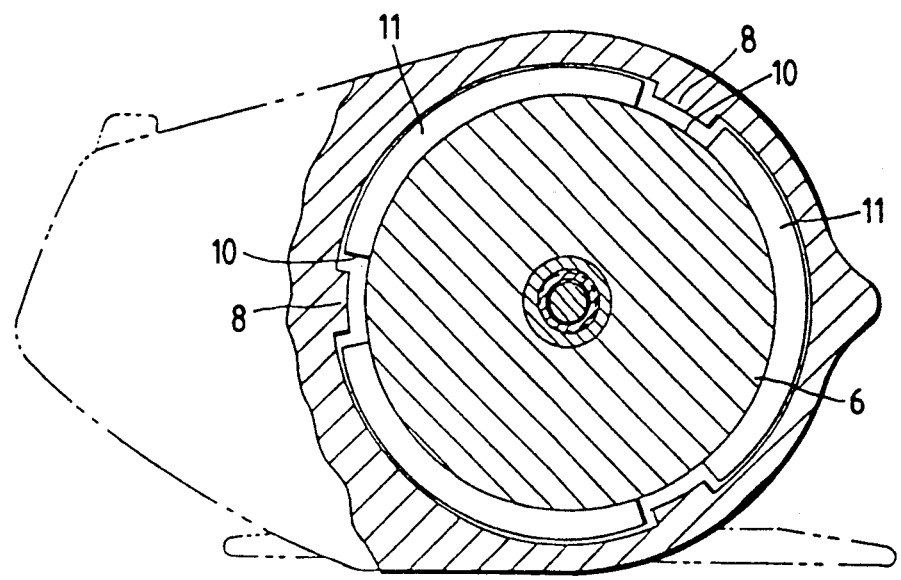
FIG. 6 is a cross-sectional view taken along line A-A of FIG. 1 in another state where the spool shaft member can be detached form the side plate.

In the fishing reel as constructed above, when the engaging pin 9 is engaged with tho engaging recess portion 12 as shown in FIG. 5, the engaging flange portion 11 is securely engaged with the engaging projections 8 as shown in FIG. 4, so that the support member 6 is securely fixed to the opening portion 5 of the side plate 4.

Figure 7:
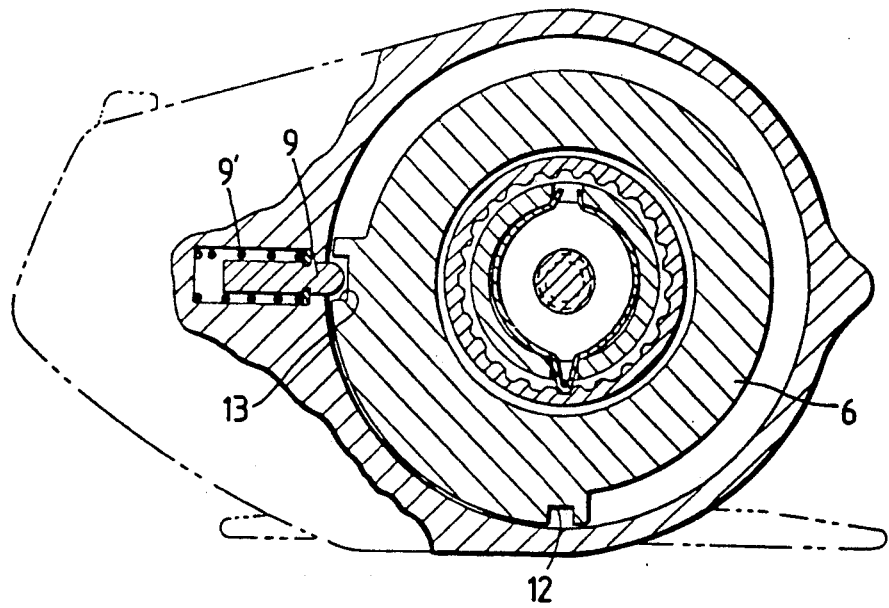
FIG. 7 is a cross-sectional view taken along line B-B of FIG. 1 in the state shown in FIG. 7.
Figure 11:
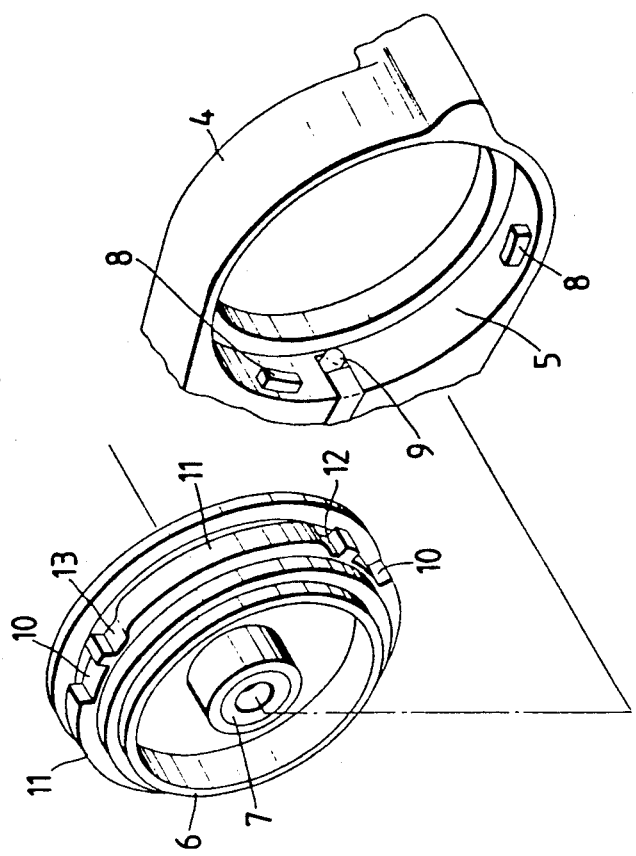
FIG. 11 is an exploded perspective view of the fishing reel shown in FIG. 9.
Figure 10:
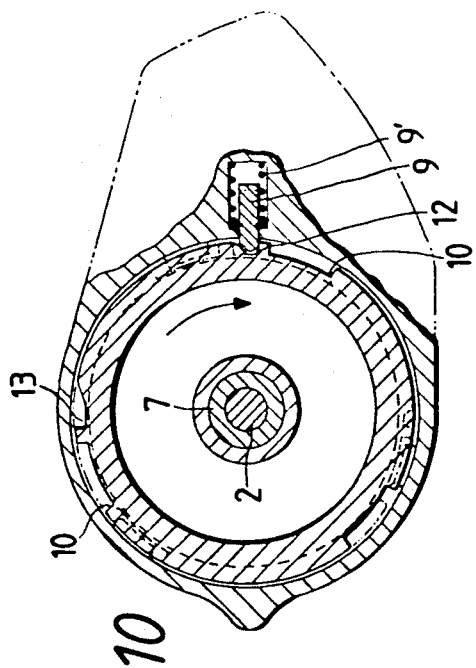
FIG. 10 is a cross-sectional view taken along line C—C of FIG. 9.

From this state shown in FIGS. 4 and 5, if the support member 6 is rotated in the counterclockwise direction in FIG. 5 while overcoming the biasing force of the spring member 9', then the engaging pin 9 is engaged with the non-engaging recess portion 13 as shown in FIG. 7. The top of the engaging pin 9 is rounded so that the biasing force of the spring member 9' can be overcome by the application of the rotation of the edge of support member 6 such that the pressure of the edge of the notch portion 12 against the engaging pin 9 overcomes the biasing force of the spring member 9'. When the engaging pin 9 is engaged with the non-engaging recess portion 13 as shown FIG. 7, the notch portion 10 is positioned so as to be confronted or aligned with the engaging projection 8 as shown in FIG. 8, so that the support member 6 can be detached from the opening portions 5 of the side plate 4 in such a manner that the engaging projection portion 8 of the opening portion 5 passes through the notch portion 10 of the support member 6. As a result, the spool 1 together with the spool shaft 2 can be attached to or detached from the reel through the opening portion 5.

Figure 12:
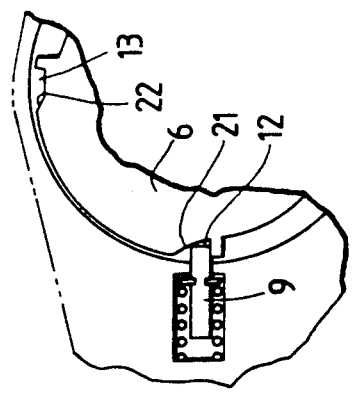
FIG. 12 is a cross-sectional view showing a major part of FIG. 10.

FIGS. 9 to 12 illustrate a fishing reel constructed according to a second embodiment of the present invention, in which the spool shaft support member 6 is provided with the engaging recess 12 and the non-engaging recess 13 on the engaging flange portion 11 having the notch portion 10, and the side plate 4 is provided with the engaging pin 9 at an inner side of the opening portion 5 from the engaging projection 8, that is, at a right hand side from the engaging projection 8 in FIG. 9. Further, as best shown in FIG. 12, the engaging recess 12 and the non-engaging recess 13 have inclined surface portions 21 and 22, respectively.

Due to the fact that the notch potion 10, the engaging flange portion 11, the engaging recess portion 12 and the non-engaging recess portion 13 are aligned on a single line on the periphery of the spool shaft support member 6, the spool shaft support member 6 and the side plate 4 can be reduced in thickness.

According to the present invention, since the spool shaft support member can be detached from the side plate by merely, operatively rotating the support member relative to the side plate, it is possible to easily, immediately perform the interchange operation wherein the spool is detached from and attached to the reel through the opening portion. In other words, the interchange operation of the spool can be easily, immediately realized by fisherman's one hand. Further, the engaging pin, which keeps the spool shaft support member in the position where the support member is securely attached to the side plate or in the position where the support member can be detached from the side plate, is provided within the opening portion of the side plate so as to be prevented form being exposed to the outside of the side plate, so that the engaging pin surely maintains its function by preventing mucus of a fish, bait for the fish, sand, or the like, which clings to the fisherman's hands, from being adhered to the engaging pin.

Additionally, since the engaging pin is provided at the inner side of the engaging projection portion on the inner circumferential surface of the opening portion of the side plate, and the engaging flange portion having notch portions, the engaging recess and the non-engaging recess are aligned on a line on the periphery of the spool shaft support member, the spool shaft support member and the side plate can be reduced in thickness, so that a width of the reel as a whole can be decreased in the axial direction of the spool shaft. Therefore, it is possible to provide the reel which is small in size and light in weight.

What is claimed is:

1. A fishing reel having a mechanism allowing for a singlehead detachment of a spool from the fishing reel comprising:
   a spool shaft securely fixed to a spool;
   a first side plate having a driving mechanism; said first side plate supporting a first end of said spool shaft;
   a second side plate positioned at a second end of the spool shaft, said second side plate facing said first side plate, said second side plate having an opening portion;
   a support member detachably fixed in said opening portion of said second side plate, said support member having a bearing portion for supporting said second end of said spool shaft;
   at least one engaging projecting portion protruding from an inner circumferential surface of said opening portion, said engaging projecting portion defining an axially facing first side and a second side opposed to said first side;
   an engaging flange portion formed on an outer peripheral surface of said support member, and positioned adjacent said first side when said flange portion is engaged with said engaging projection portion, said engaging flange portion having at least one notch portion through which said engaging projection portion can pass;
   an engaging pin reciprocative along a radial line with respect to said spool shaft and biased radially in toward said opening portion, a tip of said engaging pin protruding from said inner circumferential surface into said opening portion;
   a first engaging recess portion formed on an outer peripheral surface of said flange portion so as to engage said engaging pin with said first engaging recess portion when said engaging flange portion is engaged with said engaging projecting portion; and
   a second engaging recess portion formed on an outer peripheral surface of said flange portion so as to engage said engaging pin with said second engaging recess portion when said notch portion is aligned with said engaging projection portion,
   wherein the removal of said spool can be initiated by the rotation of the support member with respect to said opening portion and withdrawal of said support member, so that the support member can be detached from the opening portion of the second side plate, allowing for the detachment of the spool and the spool shaft from the reel through the opening portion.

2. The fishing reel according to claim 1, wherein said engaging pin is provided at said first side on said inner circumferential surface.

3. A fishing reel having a mechanism allowing for a singlehanded detachment of a spool from the fishing reel comprising:
   a first side plate for supporting one end of a spool shaft of a spool;
   a second side plate positioned opposite said first side plate at a predetermined distance and provided with an opening portion through which said spool can be inserted into said reel in place between said first and second side plates, said opening portion being provided with an inner circumferential surface portion; and
   a support member detachably fixed in said opening portion, said support member having a bearing portion for supporting the other end of said spool shaft and an outer peripheral surface portion adapted to confront said inner circumferential surface portion when said support member is fixed to said opening portion, said fishing reel comprising:
   at least one projecting portion protruding from said inner circumferential surface portion, said projecting portion defining an axially facing first side and an oppositely axially facing second side;
   a flange portion formed on said outer peripheral surface portion and slidingly guided by said projecting portion on said first side thereof, said flange portion including at least one first notch portion through which said projecting portion passes to thereby position said flange portion between said first and second sides;

an engaging pin reciprocative along a radial line with respect to said spool shaft and biased radially in toward said opening portion so that a tip of said engaging pin protruding from said inner circumferential surface portion;

first position means on an outer peripheral surface of said flange portion for engagement with said engaging pin and thereby positioning said support member at a release position where said first notch portion is aligned with said projecting portion on said first side;

second position means on an outer peripheral surface of said flange portion for engagement with said engaging pin and thereby positioning said support member at a lock position where said flange portion is engaged with said projecting portion on said first side, wherein the removal of said spool can be initiated by the singlehanded rotation of the support member, so that the support member can be detached from the opening portion of the second side plate, allowing for the detachment of the spool and the spool shaft from the reel through the opening portion.

4. The fishing reel according to claim 3, wherein said support member can be detached from said opening portion when said support member is positioned at said release position.

5. The fishing reel according to claim 3, wherein said support member is securely fixed in said opening portion when said support member is positioned at said lock position.

6. The fishing reel according to claim 3, wherein said support member is rotatable relative to said opening portion between said release position and said lock position.

7. The fishing reel according to claim 3, wherein said first position means includes a recess portion formed on said flange portion and engaged with said engaging pin at said release position.

8. The fishing reel according to claim 3, wherein said first position means includes a second notch portion formed on said flange portion and engaged with said engaging pin at said release position.

9. The fishing reel according to claim 3, wherein said second position means includes a recess portion formed on said flange portion and engaged with said engaging pin at said lock position.

10. The fishing reel according to claim 3, wherein said second position means includes a third notch portion formed on said flange portion and engaged with said engaging pin at said lock position.

11. The fishing reel according to claim 3, wherein said first position means includes a second notch portion formed on said flange portion and said second position means includes a third notch portion formed on said flange portion, wherein said engaging pin is selectively engaged with said second and third notch portions at said release position and at said lock position, respectively.

12. The fishing reel according to claim 11, wherein said second and third notch portions are formed with inclined surface portions continuously adjoining said flange portion to release the engagement of said engaging pin with one of said second and third notch portions.

13. The fishing reel according to claim 11, wherein said tip of said engaging pin is rounded in cross section to release the engagement of said engaging pin with one of said second and third notch portion.

14. The fishing reel according to claim 11, wherein said support member is provided with concave portions for rotating said support member.

15. The fishing reel according to claim 11, wherein said engaging pin is provided at said first side in said opening portion.

* * * * *